United States Patent [19]

Sprague

[11] Patent Number: 4,756,112
[45] Date of Patent: Jul. 12, 1988

[54] FISHING LURE RETRIEVER

[76] Inventor: Michael M. Sprague, 16843 4th Ave., S., Seattle, Wash. 98148

[21] Appl. No.: 928,191

[22] Filed: Nov. 7, 1986

Related U.S. Application Data

[63] Continuation-in-part of Ser. No. 815,514, Jan. 2, 1986, abandoned.

[51] Int. Cl.$^4$ .............................................. A01K 97/00
[52] U.S. Cl. ................................................... 43/17.2
[58] Field of Search ......................................... 43/17.2

[56] References Cited

U.S. PATENT DOCUMENTS

| | | | |
|---|---|---|---|
| 2,479,448 | 8/1949 | Woock . | |
| 2,760,810 | 8/1956 | Smith . | |
| 2,807,906 | 10/1957 | Mun | 43/17.2 |
| 2,826,849 | 3/1958 | Frederick | 43/17.2 |
| 2,827,730 | 3/1958 | Hunt | 43/17.2 |
| 2,909,861 | 10/1959 | Leming | 43/17.2 |
| 2,915,845 | 12/1959 | Hughes | 43/17.2 |
| 3,550,303 | 12/1970 | Western | 43/17.2 |
| 4,085,537 | 4/1978 | Todd | 43/17.2 |
| 4,536,984 | 8/1985 | Kowal | 43/17.2 |

Primary Examiner—Gene P. Crosby
Attorney, Agent, or Firm—Christensen, O'Connor, Johnson & Kindness

[57] ABSTRACT

A device for retrieving fishing lures that have become snagged on an underwater obstruction such as a rock or tree stump. The retriever includes a weighted body having a unique system of opposing guideways adapted to slideably engage a fishing line attached to the snagged lure, and a unique trap section at its forward end. The guideways are formed entirely by converging walls of the body and are interconnected by cross slots. The trap section includes a plurality of staggered hooks of varying length which extend forward from the body and are intended to engage some portion, especially the eye, of the snagged lure. After the lure is captured by the retriever, both may be recovered by means of a retrieve line attached to the retriever body which has a considerably higher tensile strength than the fishing line.

5 Claims, 2 Drawing Sheets

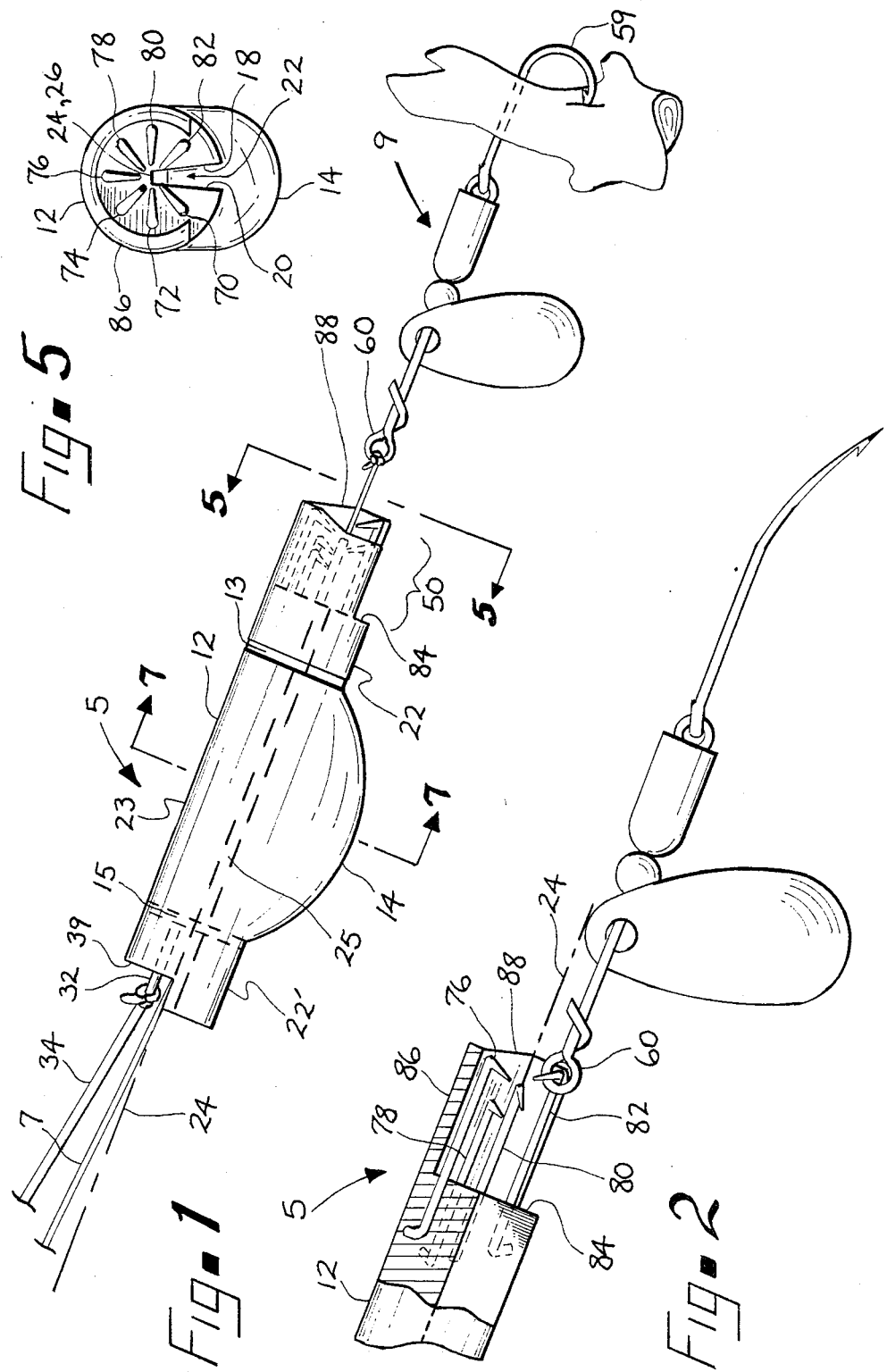

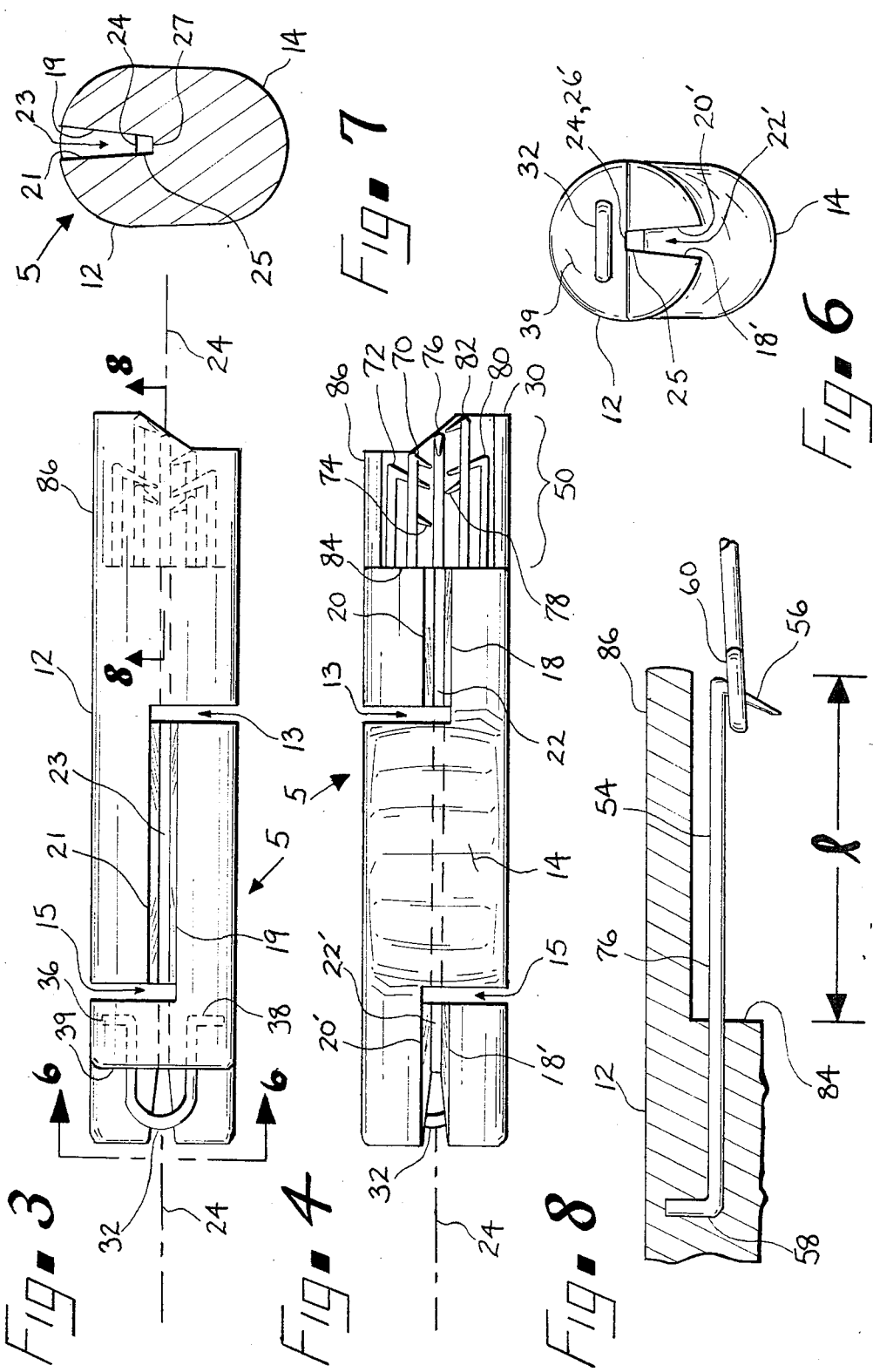

FISHING LURE RETRIEVER

This application is a continuation-in-part of abandoned application Ser. No. 815,514, filed 2 Jan. 1986, on a Fishing Lure Retriever, by the present applicant. The invention relates generally to fishing equipment and more particularly to a device for recovering snagged fishing lures.

BACKGROUND OF THE INVENTION

Fishing lures seldom wear out. They are most commonly lost when they accidentally become snagged on a submerged rock or tree stump. Although the lure body may become wedged in the obstruction, it is more likely that the fishing hooks attached to the body will penetrate or become caught in it. In that case, if the fishing line were strong enough, the fisherman operating the lure could retrieve it simply by pulling on the fishing line until the hook bent and the lure was freed. Fishing line typically used today by sports fishermen is far too low in tensile strength to bend the hooks, so unless the lure can be freed by gentle pulling from another direction or by jiggling, it will have to be abandoned in a watery grave.

There have been numerous attempts throughout the years to develop a practical means to retrieve snagged fishing lures, but most such devices have failed commercially either because they were too expensive in relation to the cost of a lure or because they simply did not work well. Also, because of certain design deficiencies, some earlier retrievers that functioned satisfactorily with one type of lure would not work with others.

Accordingly, it is an object of this invention to provide for a fishing lure retriever which can be used effectively to recover all common types of fishing lures.

It is another object of this invention to provide for a fishing lure retriever which can be manufactured and sold for a reasonable cost in relation to the cost of a typical fishing lure.

It is another object of this invention to provide for a fishing lure retriever having a unique arrangement of staggered trap hooks of varying lengths which will have a higher probability of securely engaging a snagged lure than previously known retrievers.

It is a further object of this invention to provide for a fishing lure retriever having a unique system of opposing guideways for securely but slideably engaging a fishing line attached to the lure, which system has no moving or projecting parts subject to damage or wear, and requires minimal effort for a fisherman to operate.

A yet further object of this invention is to provide for a fishing lure retriever which because of its relatively simple design and construction is very durable and useful in both fresh and salt water.

SUMMARY OF THE INVENTION

This invention can be broadly summarized as providing for a fishing lure retriever having a weighted body including means for slideably engaging a fishing line attached to the snagged lure, which engaging means defines an axis with respect to the body, and further having a number of trap hooks of varying lengths fixedly projecting from the body and being radially disposed about and mostly surrounding the axis.

In accordance with a more detailed aspect of this invention the retriever includes a weighted body having converging walls which form a system of opposing guideways for slideably engaging the fishing line, said system defining an axis along the body, wherein the guideways are oriented along and overlap said axis and are interconnected by means of cross slots.

In accordance with a yet more detailed aspect of this invention the retriever inlcudes a weighted body having an elongated upper section and a ballast belly extending downward from the upper section. Said guideways are oppositely fixed and together compose a system for engaging the fishing line, which system defines an axis along the body. The retriever also includes a trap section which includes a number of trap hooks which project from the body and are radially disposed about the axis, and a trap sheath projecting forward from the body beyond the hooks and partially surrounding them.

BRIEF DESCRIPTION OF THE DRAWING

FIG. 1 is a side view of a fishing lure retriever constructed in accordance with the present invention and shown in operating position on a fishing line.

FIG. 2 is a side view, partially cut away, of the trap section of the retriever of FIG. 1.

FIGS. 3 and 4 are top and bottom views, respectively, of the same retriever.

FIG. 5 is a sectional view taken at 5—5 in FIG. 1.

FIG. 6 is an end view taken at 6—6 in FIG. 3.

FIG. 7 is a sectional view taken at 7—7 in FIG. 1.

FIG. 8 is a partial sectional view taken at 8—8 in FIG. 3.

DESCRIPTION OF THE PREFERRED EMBODIMENT

The novel features believed to be characteristic of this invention are set forth in the appended claims. The invention itself, however, may be best understood and its various objects and advantages best appreciated by reference to the detailed description below in connection with the accompanying drawings. In FIGS. 1 through 8 of those drawings a fishing lure retriever constructed in accordance with the teachings of the present invention is illustrated and generally designated by the number 5. FIG. 1 shows the retriever in normal operating position, slideably suspended from fishing line 7 which is attached to snagged lure 9.

The retriever includes body 12 which is preferably cast of some relatively inexpensive corrosion-resistant metal or alloy such as lead or zinc. Referring to FIG. 5 it can be seen that in cross section the upper portion of the body is generally cylindrical in shape and the lower portion includes ballast belly 14 which extends downward from the upper portion.

It can also be seen in FIG. 5 that converging walls 18 and 20 cooperate to form guideway 22 which is recessed in the underside of the upper portion and extends back to the ballast belly 14. Upper end 26 of this guideway corresponds with axis 24 and has a radius sufficient to permit smooth passage of fishing line typically used in sportfishing. FIG. 6 shows a guideway 22' behind the ballast belly. This guideway can be considered a continuation of guideway 22; converging walls 18' and 20' and upper end 26' correspond exactly with their counterparts on the other side of the ballast belly. In other words between guideways 22 and 22', along the underside of the retriever body, the ballast belly intervenes (FIG. 4). Between them along axis 24, a third and opposing guideway intervenes (FIG. 3). As best shown in FIG. 7, converging walls 19 and 21 cooperate to form guideway 23 which is recessed in the topside of the upper portion. Lower end 27 of this guideway overlaps slightly beyond axis 24 and has a radius sufficient to permit smooth passage of fishing line. Together these guideWAYS delineate a straight guide channel 25 for slideably engaging the fishing line (FIGS. 1, 6 and 7).

Cross slots 13 and 15 serve to interconnect the guideways to admit the line into the guide channel. As shown in the Figures, slot 13 connects guideways 22 and 23, and slot 15 connects 23 and 22'. As best shown in FIGS. 3 and 4, each cross slot is perpendicular to the guideways and cuts slightly more than halfway into the body. Also, the slots are placed on opposite sides of the body for the sake of balance.

The system so constituted by opposing guideways and cross slots is completely open, yet at the same time effectively and slideably locks the line in the retriever. Briefly, it works because, when placed on the line as shown in FIG. 1, the lower guideways straddle the line while the upper guideway cradles it in the opposite direction. Moreover, because fishing line is relatively stiff, and because it is held taut during retrieval, the line tends to stay put in the guideways.

Eyelet 32, which is formed of corrosion-resistant wire, is embedded in the aft end of the retriever and provides a connection for retrieve line 34. It is located quite close to axis 24 so that force applied to the retriever will be substantially oriented along that axis. In the preferred embodiment the eyelet was embedded during the casting process and ends 36 and 38 were bent at right angles as shown in FIG. 3 to provide a secure anchor for the eyelet. In order to protect the eyelet from damage in the event the retriever is dropped, it has been recessed in indentation 39 as shown.

Retrieve line 34 has a substantially higher tensile strength than fishing line 7 and should be a type of line which resists wear, spools well and stretches relatively little under tensile load. In the preferred embodiment a braided Dacron line having an 80 pound test strength was selected as the retrieve line.

Ballast belly 14 is an integral part of the cast body and extends downward between the guideways, as best shown in FIG. 1. It is streamlined to reduce drag acting upon it as the retriever glides through the water, as well as to enhance its appearance. Its purpose is to lower the body's center of gravity to well below axis 24, so that the retriever tends to remain in the same upright position when placed on fishing line 7. An obvious modification would be to spread the ballast material more evenly along the underside of the retriever, rather than concentrate it in a belly.

One of the most significant aspects of this invention is found in trap section 50 which is located at forward end 30 of the retriever. The trap section houses a number of specially designed and oriented trap hooks which are intended to engage some portion, especially eye 60, of snagged lure 9. Referring to FIG. 8, it can be seen that hook 76 (which is typical) has a straight shank 54 and an abruptly bent pointed barb 56 at its forward end. Aft end 58 of the hook, which is bent at a sharp right angle, serves to anchor the hook securely in the body casting. Preferably, the hook is made from stainless steel or another strong, corrosion-resistant wire. The diameter of the wire is selected so that the hook is substantially stronger than lure hook 59, but is not so large that it will not easily pass through lure eye 60.

In the preferred embodiment the trap section houses seven such trap hooks designated by the numbers 70, 72, 74, 76, 78, 80 and 82 which are radially disposed about and largely surround axis 24. Each of the hooks is positioned so that its shank projects forward from inner end 84 of the trap section substantially parallel to axis 24 and its barb extends radially inward toward axis 24. Also the length l of each hook, as measured from end 84 to the tip of the shank (see FIG. 8), differs so that the barbs are arranged in a staggered array. In the preferred embodiment, for example, the length l for hooks 70, 72, 74, 76, 78, 80 and 82 equals 12, 10, 7, 14, 9.5, 11 and 16 millimeters, respectively. It should be understood, however, that this particular staggered arrangement or these particular lengths are not considered unique by the inventor and that other staggered arrangements may work.

One method suggested by the inventor for embedding the trap hooks in the retriever body involves the combined use of conventional and investment casting. By this method a conventional mold is prepared for the body including the trap sheath. In a separate operation the trap hooks which have been arranged in the desired orientation are encapsulated in a cylinder of investment material having a diameter equal to the inner diameter of the trap section. After the cylinder containing the trap hooks has hardened, it is placed in the mold with the anchor ends of the trap hooks projecting into the retriever body cavity. After the body is poured the investment material can be chipped away, leaving the hooks embedded in the body and oriented in the desired positions.

Another feature of the trap section is trap sheath 86 which is cylindrical in shape and partially encloses the array of hooks. It extends forward from the body and preferably is cast as an integral portion of it. The purpose of the sheath is to protect the hooks in the event the retriever is accidentally dropped. Forward end 88 extends forward even with the longest trap hook and is shaped so as to provide protection for each of the hooks. The sheath is unessential to the function of the trap section and may be eliminated if desired.

The weight of the retriever is not critical but it must be sufficient that it will sink easily and slide rapidly along a submerged, downwardly inclined fishing line. When placed on a fishing line as shown in FIG. 1, the retriever will be urged forward or to the right along the line by the component of gravity acting along the line. The more shallow the angle of the fishing line with respect to the horizontal, the smaller that component will be. The forces that tend to retard motion of the retriever along the line include the resistance of the fishing line as it passes through the guide channel, the drag of the retrieve line, and the hydrodynamic drag of the body as it moves through the water.

In some situations if the lure becomes snagged near the surface of the water the angle of declination of the line may only be ten or fifteen degrees, so the weight must be sufficient to overcome these various resistances and permit the retriever to move forward along the line. It would appear that the heavier the body the better, but, obviously, due to the limited strength of the fishing line carrying the retriever, the weight must be limited. For example, the weight of the preferred embodiment is approximately 5 ounces.

It is suggested for convenient operation of the retriever that the retrieve line be stored on a reel which can be operated by the fisherman. Preferably the reel should include a spool which can be permitted to run free when the retrieve line is being dispensed, means for winding the spool in order to recover the retrieve line, and a ratchet which can be engaged to prevent the spool from unwinding during recovery. Details of the construction of such a reel should be obvious to those of ordinary skill in the art.

The retriever is primarily designed for use with fresh water lures, but it is easily adaptable for use with many salt water lures. Because it is constructed from corrosion-resistant materials it will not be subject to the corrosion that plagues most salt water fishing gear.

To use the retriever, a fisherman begins by grasping the fishing line in one hand and the retriever in the other. If the retriever is used with an accessory reel, as suggested, the same hand that holds the line may also hold the reel. Because of the openness of its guideway system, only one hand is really needed to place the retriever on the line as shown in FIG. 1. By alternately tipping and turning the retriever, the fishing line may be positioned in the guide channel. This accomplished, the fisherman pulls the fishing line taut and lets the retriever slide down to the snagged lure. If the angle of the line with respect to the horizontal is so shallow that the retriever either will not proceed or moves very slowly down the line, then the angle should be increased by raising the tip of the fishing pole.

The retriever is uniquely designed to take advantage of a common feature of practically all fishing lures, which is a connecting eye similar to lure eye 60. Of course, it can also engage other irregularities in the forward portion of the lure such as snaps, swivels, split rings and so forth. As the retriever descends, fishing line 7 is drawn directly through the center of trap section 50 substantially along axis 24. Accordingly, when the retriever reaches the lure, eye 60 will be drawn directly into the center of the trap section and some part of the lure will impact the retriever. This impact is felt throught the fishing line by the fisherman, who then should stop futher rotation of the reel spool. Next, the fisherman slowly begins to rewind retrieve line 34, and some forward part of the lure will likely be captured in the trap section.

The retriever may free a snagged lure by hooking a part of it with one of the trap hooks, by wedging or trapping a part in the spaces between the trap hooks, or upon impact by hammering the lure backward. In engaging the lure, the trap section functions somewhat like a three-dimensional pinball machine. Because the barbs of the trap hooks point rearward, lure eye 60 or other forward parts of the lure are permitted to penetrate the trap section. And because the trap hooks are made of springy wire, their long shanks flex somewhat to let parts penetrate even farther. Also, because the retriever can rock and rotate slightly on the fishing line, it is possible for the trap section to rotate or move laterally to accommodate parts as they enter. As the retriever is drawn backward, however, each barb becomes an obstacle to the exit of a part. The part will be rotated, shunted and prodded from all sides as it is drawn through the array of barbs, and it is highly likely that in the process it will become hooked or trapped between them. If the lure is not engaged on the first attempt, the fisherman should continue to slowly jig the retriever until engagement occurs. Accordingly, the inventor believes that this unique arrangement of staggered hooks offers a much higher probability of capturing the lure than is found in previously known retrievers.

Once the lure is captured, the fisherman engages the ratchet on the reel, pulls smoothly and steadily until the lure is freed, and then reels up the retriever and the lure. With a re-shaping or replacement of fishing hook 59, the lure is again ready for use.

Thus it can be seen that the present invention provides for an improved retriever for recovering snagged fishing lures which incorporates many novel features and offers significant advantages over the prior art. Although only one embodiment of this invention has been illustrated and described, it is to be understood that obvious modifications can be made of it without departing from the true scope and spirit of the invention.

I claim:

1. A fishing lure retriever comprising:
   a weighted body having means for slidably engaging a fishing line attached to the lure, said means defining an axis along the body and including opposing guideways oriented along and overlapping said axis, said guideways formed by converging walls of the body and interconnected by means of cross slots; an elongated upper portion; and ballast for providing a center of gravity beneath said axis between the ends of the weighted body;
   a trap section including a plurality of trap hooks projecting from the body and radially disposed about the axis, and a trap sheath extending forward from the body beyond the hooks and partially surrounding them; and
   means for recovering the retriever including a line attached to the body and having a higher tensile strength than the fishing line.

2. The fishing lure retriever of claim 1, wherein the ballast extends along the underside of said elongated upper portion.

3. A fishing lure retriever comprising:
   a weighted body including means for slideably engaging a fishing line attached to the lure, said engaging means defining an axis with respect to the body;and
   a plurality of trap hooks of varying lengths, fixidly projecting from the body and radially disposed about the axis and defining a channel of hooks that surrounds the axis to an extent greater than 180 degrees;
   said body including a trap sheath for protecting the trap hooks, said trap sheath being a cylindrically shaped member that extends forwardly from the body and partially surrounds the trap hooks.

4. A fishing lure retriever comprising:
   a weighted body, including engaging means for a slideably engaging a fishing line attached to the lure, said engaging means defining an axis with respect to the body, said body including an elongate upper portion and ballast for providing a center of gravity beneath said axis between the ends of the weighted body; and
   a plurality of trap hooks of varying lengths, fixidly projecting from the body and radially disposed about the axis and defining a channel of hooks that surrounds the axis to an extent greater than 180 degrees.

5. The fishing lure retriever of claim 4, wherein the ballast extends along the underside of said elongated upper portion.

* * * * *

UNITED STATES PATENT AND TRADEMARK OFFICE
CERTIFICATE OF CORRECTION

PATENT NO. : 4,756,112

DATED : July 12, 1988

INVENTOR(S) : Michael M. Sprague

It is certified that error appears in the above-identified patent and that said Letters Patent is hereby corrected as shown below:

Column 5, line 36: "futher" should be --further--

Column 6, line 50: After "for" - delete "a"

Signed and Sealed this

Fourteenth Day of February, 1989

Attest:

DONALD J. QUIGG

Attesting Officer

Commissioner of Patents and Trademarks